United States Patent [19]
Villari

[11] 3,929,412
[45] Dec. 30, 1975

[54] LIQUID RECEIVING DEVICE
[75] Inventor: Frank K. Villari, Oak Park, Ill.
[73] Assignee: The Kendall Company, Walpole, Mass.
[22] Filed: Nov. 15, 1974
[21] Appl. No.: 524,023

[52] U.S. Cl. .................. 23/259; 128/295; 4/110; 73/215
[51] Int. Cl.² .................. G01F 1/20; G01N 33/16
[58] Field of Search .. 23/259, 230 R, 253 R, 230 B; 128/2 F, 295; 4/109, 110; 73/215

[56] References Cited
UNITED STATES PATENTS

| | | | |
|---|---|---|---|
| 3,170,169 | 2/1965 | Clark | 4/109 |
| 3,248,740 | 5/1966 | Wisnom | 4/109 |
| 3,445,865 | 5/1969 | Rumsey, Jr. | 4/109 |
| 3,499,327 | 3/1970 | Lane, Jr. | 128/2 F UX |
| 3,602,923 | 9/1971 | Girala | 128/295 X |
| 3,742,934 | 7/1973 | Holbrook et al. | 128/2 F |

*Primary Examiner*—Robert M. Reese
*Attorney, Agent, or Firm*—Powell L. Sprunger

[57] ABSTRACT

A device to receive a discharge of liquid comprising, a receptacle having a chamber and port means adjacent an upper end of the receptacle to receive the discharge for passage of the discharge into the chamber. The device has means intermediate the port means and chamber for breaking up the discharge.

14 Claims, 7 Drawing Figures

U.S. Patent  Dec. 30, 1975  3,929,412
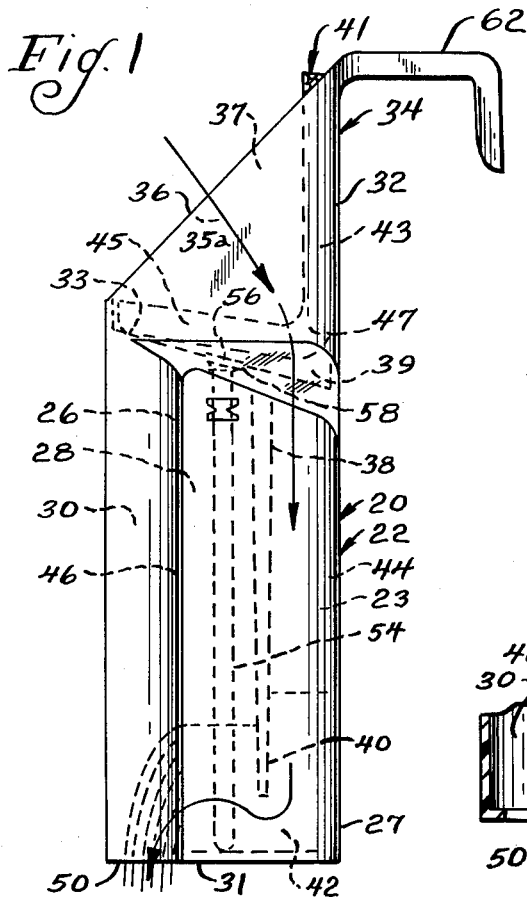
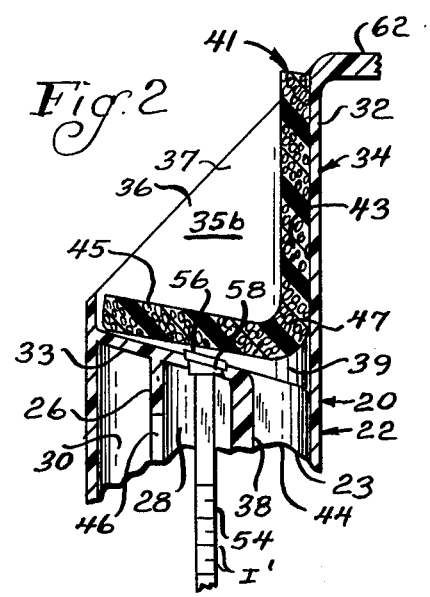
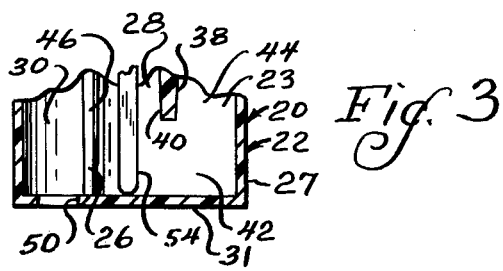
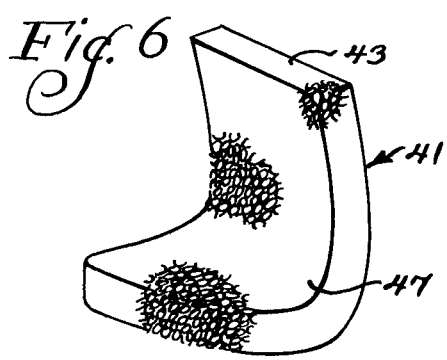
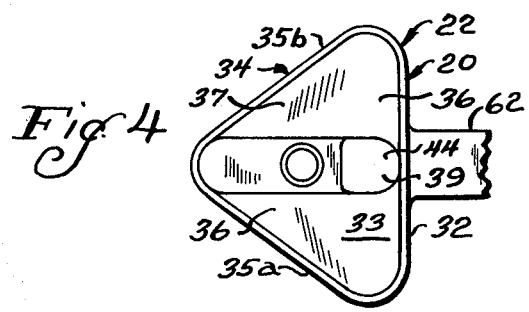
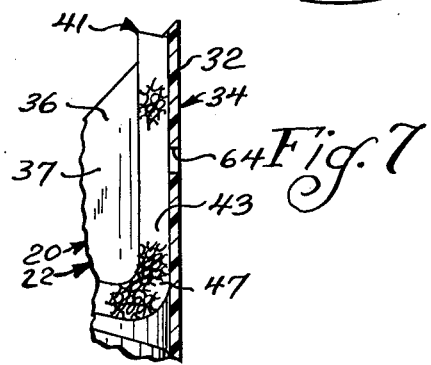
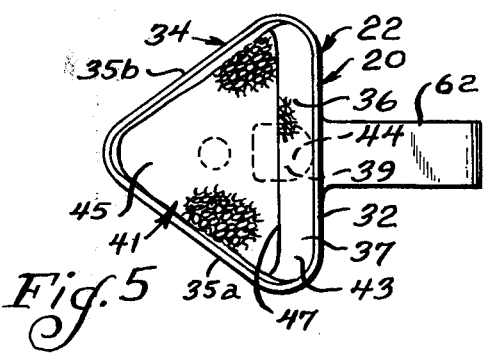

3,929,412

LIQUID RECEIVING DEVICE

BACKGROUND OF THE INVENTION

The present invention relates to liquid receiving devices, and more particularly to devices for measuring and collecting a discharge of liquid.

In the past, it has been found desirable to obtain various data pertaining to a liquid discharge. In particular, it was discovered that many urological problems could be readily diagnosed by analyzing information obtained during the natural voiding of urine by patients. Presently, various types of devices are utilized to obtain data on the urine stream, such a total volume, average flow rate, force, velocity, and configuration of the stream.

Most of these devices have suffered from less than total reliability because they have required the presence of one or more observers while the patient is voiding. It is obvious that administration of such devices in this manner creates sufficient psychological difficulties for many of the patients to effect voiding. Consequently, if the patients void at all, the potentially erroneous data obtained may result in a false diagnosis and a loss of confidence in the device by the physician. A further complication arises from the fact that many of these devices are rather bulky, and are somewhat difficult to use.

It is preferred that the urine discharge be directed into the measuring device in an even stream to obtain a more accurate determination of the data associated with the discharge. Moreover, urine has a tendency to foam, and it is desirable to limit foaming of the discharge, as well as prevent splashing of the discharge against the patient during use of the device.

SUMMARY OF THE INVENTION

A principal feature of the present invention is the provision of a device of simplified construction for measuring and collecting a urine discharge, and which may be self-administered by a patient.

The device of the present invention comprises, a receptacle having a chamber and port means adjacent an upper end of the receptacle to receive the discharge for passage of the discharge into the chamber. The device has means intermediate the port means and chamber for breaking up the urine discharge.

Thus, a feature of the invention is that the breaking means provides an even flow of the discharge into the chamber for a more accurate determination of data associated with the discharge.

Another feature of the invention is that the breaking means prevents foaming of the urine.

Yet another feature of the invention is that the breaking means prevents splashing of the discharge against the user.

Further features will become more fully apparent in the following description of the embodiments of this invention and from the appended claims.

DESCRIPTION OF THE DRAWINGS

In the drawings:
In the drawings:

FIG. 1 is an elevational view of a liquid receiving device of the present invention, containing a strip of porous material to break up a liquid discharge passing into a receptacle;

FIG. 2 is a fragmentary sectional view of an upper end of the receptacle of FIG. 1;

FIG. 3 is a fragmentary sectional view of a lower end of the receptacle of FIG. 1;

FIG. 4 is a top plan view of the receptacle of FIG. 1 with the strip of porous material removed from the receptacle;

FIG. 5 is a top plan view of the device of FIG. 1;

FIG. 6 is a perspective view of the strip of porous material which is placed in the receptacle; and FIG. 7 is a fragmentary sectional view showing another embodiment of the receptacle of the present invention.

DESCRIPTION OF THE PREFERRED EMBODIMENTS

Referring now to FIGS. 1–3, there is shown a device, generally designated 20, for measuring and collecting a discharge of liquid, such as urine. The device 20 includes a hollow receptacle designated generally 22 having a chamber 23, and a container (not shown) which may be releasably attached to a lower end 27 of the receptacle by suitable means (not shown). Preferably, the receptacle 22 is made from a suitable transparent material, such as plastic.

The receptacle 22, which may have rounded end portions and an elongated central portion, as shown, has an upright wall 26 which extends laterally across the inside of the receptacle and which extends vertically the height of the receptacle. The upright wall 26 separates the chamber 23 into a compartment 28 and a channel or channel means 30. The lower end of the compartment 28 is closed by a bottom wall 31.

As shown in FIGS. 1, 2, 4, and 5, the receptacle 22 has an enlarged or discharge receiving portion 34 adjacent an upper end of the receptacle defining an inlet port or port means 36 to receive the incoming urine discharge, as indicated by the direction of the arrows in FIG. 1. The receptacle has a wall 38, as shown in FIGS. 1–3, extending laterally across the inside of the receptacle, and having a lower end 40 defining a space 42 intermediate the lower end 40 of the wall 38 and the lower or the bottom wall 31 of the receptacle. The wall 38 partially defines the compartment 28 and a passageway or passageway means 44 intermediate the wall 38 and an outer sidewall of the receptacle 22. Thus, the urine discharge passes from the port means 36 through the passageway 44 and space 42 into the compartment 28.

The wall 26 has an elongated vertical slot or opening means 46 communicating between the compartment 28 and the channel means 30 to permit passage of the liquid from the compartment to the channel means. As shown in FIGS. 1 and 3, the bottom wall 31 defines opening means 50 for directing liquid from the channel means 30 into the lower container, as will be further described below.

As shown in FIGS. 1, 2, 4 and 5, the discharge receiving portion 34 has an upright back wall 32, a lower wall 33, and a pair of sidewalls 35a and b connecting the back and lower walls 32 and 33 thus defining a cavity 37. The lower wall cover at least a portion of the channel 30 and compartment 28, and defines an opening or opening means 39 communicating between the cavity 37 and passageway 44 at a lower end of the cavity 37 adjacent the juncture of the back and lower walls 32 and 33. The sidewalls 35a and b define a tapered configuration of the enlarged portion 34 from the back wall 32 to a front of the receptacle, and the back wall 32 and sidewalls 35a and b define a generally triangular shape for the inlet port 36 to receive the discharge.

A strip 41 of liquid porous material is removably received in the cavity 37 intermediate the inlet port 36 and the opening means 39, such that at least a portion of the strip 41 covers the opening means 39. As illustrated in FIGS. 1, 2, 5 and 6, the strip 41 may have a generally rectangular shaped back section 43 and a lower triangular shaped section 45 which is connected to the back section 43 along a fold line 47. When the strip 41 is positioned in the cavity 37, the back section 43 is located adjacent the back wall 32, and the lower section 45 is located adjacent the lower wall 33.

The strip 41 may be made of any suitable material, such as open cell polyurethane. The strip 41 is preferably treated with a coating of a foam preventing material, such as by dipping the strip into a solution of an anti-foam agent. A suitable solution for treating the strip is a silicone defoamer Antifoam A Compound, a mixture of silica gel and dimethicone that has an average chain length of 200 to 350 dimethylsiloxane units, sold by Dow Corning Corporation, and diluted by 25 parts of carbontetrachloride to 1 part of the antifoam compound.

In use, the strip 41 breaks up the urine discharge passing into the cavity 37, and provides an even flow of the discharge through the opening means 39 into the passageway 44 to permit a more accurate determination of data associated with the discharge in the compartment 28. The strip 41 also prevents splashing of the discharge against the patient using the device. Additionally, the treated strip 41 prevents foaming of the urine discharge in the cavity 37, and thus prevents collection of foam in the cavity 37.

As shown in FIGS. 1–3, an elongated indicating strip 54 is positioned in the compartment 28. The strip 54 may be retained in an upright position in the compartment by a plug 56 which is received in an opening 58 in the lower wall 33 of the enlarged portion 34. An upper end of the strip 54 is secured to the plug 56, such as by a slot in the plug to receive the upper end of the strip, and a lower end of the strip 54 is located adjacent a lower end of the chamber 23 when the strip is positioned in the compartment 28 by the plug 56.

The indicating strip 54 is sensitive to contact or wetting by liquid, such as urine, and provides an indication of the maximum height of liquid reached in the compartment 28 during the liquid discharge. Any suitable material may be utilized for the indicating strip 54, such as a material which changes color upon contact by the liquid. For example, a methylene blue compound or rhodamine may be utilized on the strip 54 to obtain the desired indication. Flow rate information may be determined by suitable indicia I' spaced along the strip, as shown in FIG. 2.

In use of the device, the strip 41 is placed into the enlarged portion 34, and the lower container may be attached to the lower end 27 of the receptacle 22. The inlet port 36 of the receptacle 22 is then positioned by a patient in privacy to receive the discharge of urine. As the liquid discharge passes into the enlarged portion 34 of the receptacle and through the strip 41, the discharge is directed by the enlarged portion 34 into the passageway 44 for collection in the receptacle. As the discharge continues, the liquid collects in the lower part of the compartment 28 and passes from the compartment 28 through the slot 46 into the channel 30. From the channel, the liquid passes through the port means 50 into the lower container for collection. As the rate of discharge into the receptacle increases, the height of liquid in the compartment 28 also increases while the liquid also drains through the slot 46 into the channel 30.

For a given rate of flow of the discharge into the receptacle the liquid attains a fixed height in the compartment 28, and the liquid passes at a fixed rate of flow through the slot 46. Hence, if the rate of flow of the liquid discharge into the receptacle increases, the height of liquid in the compartment rises an additional amount, and the rate of flow through the slot 46 also increases, since the liquid flows through a larger vertical portion of the slot 46. Thus, as long as the rate of flow of the discharge into the receptacle increases, the height of liquid in the compartment 28 continues to rise, and the rate of flow of liquid through the slot 46 also increases. When the flow rate of the incoming discharge abates, the liquid drains from the compartment 28 into the channel 30 faster than it enters the compartment, and the height of the liquid in the compartment begins to subside.

Peak flow rate of the incoming liquid discharge may be defined as the maximum rate of flow of the discharge. Since the height of liquid in the compartment rises or lowers responsive to an increase or decrease, respectively, of the flow rate of the incoming discharge, it is apparent that the maximum height of liquid attained in the compartment during the discharge serves as an indication of the approximate peak flow rate of the discharge. Although anomalies in the discharge, such as a momentary surge of the discharge, may not be ultimately reflected in the maximum liquid height in the compartment, due, in part to the lag between the time the discharge enters the receptacle and the time it enters the compartment, the device determines the peak flow rate with sufficient accuracy for such purposes as are under discussion. In particular, a urine stream during voiding has a relatively slow rate of change of flow rate, and the device of the present invention indicates a peak flow rate for the discharge which is sufficiently accurate for purposes of diagnosing the patient.

It is possible that the approximate peak flow rate of the urine discharge may be determined by observing the highest level of liquid accumulated in the compartment 28 during the discharge. Direct reading by the patient may be impractical or difficult during self-administration of the apparatus as thus far described, if the apparatus is utilized to collect a discharge of liquid during voiding, and it is desirable that the device be self-administered by the patient in order to alleviate any psychological problems of the patient which might be caused by observation of the receptacle during voiding.

Accordingly, the indicating strip 54 has been provided to automatically record the approximate maximum height of liquid collected in the compartment 28 during the liquid discharge. After the liquid discharge has been completed, a direct reading of the approximate peak flow rate may be determined by the indicia I', as shown in FIG. 2. Alternatively, the indicia I' may be placed on the wall of the transparent receptacle 22.

It is apparent that the rate of drainage from the compartment 28 into the channel 30 is partly dependent upon the precise structure of the receptacle 22. For example, although the slot 46 is shown as having parallel sides, it is contemplated that the slot may be widened or narrowed at desired vertical positions to increase or decrease the flow rate of liquid through the wall in that area, and the wall 26 may have a plurality of slots of openings if desired. Also, the cross sectional area of the compartment 28 itself may be selected of a suitable size to provide the desired sensitivity of liquid column height for a more accurate determination of the peak flow rate.

It is contemplated that a particular structure for the receptacle would first be established, dependent on the accuracy desired and the expected range of values for the peak flow rate of the liquid discharge. Next the receptacle could be calibrated against known constant flow rates of a discharge passing into the receptacle to determine the appropriate location for the indicia I' on the strip 54. That this may be readily accomplished is apparent from the fact that the peak flow rate for a discharge having a constant flow rate is the value of the constant flow rate itself. Accordingly, when the discharge of constant flow rate is directed into the receptacle, liquid rises in the compartment to a level at which liquid entering the compartment is offset by the liquid draining from the compartment into the channel, and the receptacle 22 or strip 54 is marked at this height for peak flow rate by the value of the flow rate of the constant discharge.

As noted above, once the rate of flow of the liquid discharge into the receptacle abates, the height of the liquid in the compartment 28 subsides, and the approximate peak flow rate has already been determined on the indicating means or strip 54. During the remainder of the liquid discharge, the liquid continues to drain from the compartment 28 into the channel 30 until the discharge is terminated and drainage from the compartment to the channel eventually stops. Since the liquid drains from the channel 30 of the receptacle 22 into the lower container, the volume of liquid which collects in the lower container during the liquid discharge may readily be determined.

Since the patient may use the device without observation, unnatural voiding or failure to void which normally occur from psychological difficulties when a patient voids under observation is prevented. After voiding, the patient merely summons the physician or nurse, who then uses the device to diagnose the patient's voiding. As previously indicated, the indicating strip 54 may be used to obtain a reading of the peak flow rate of the urine discharge by the indicia I' on the strip 54. The lower container may be removed from the receptacle 22 to obtain a specimen of urine or determine the volume of the urine discharge. The strip 41 may be replaced, and the receptacle 22 may be cleaned and sterilized for future use to reduce the cost of diagnosing various patients.

As illustrated in FIGS. 1, 2, 4 and 5, the receptacle 22 may have a hook 62 extending outwardly from the back wall 32 adjacent an upper end of the enlarged portion 34. The hook 62 may be utilized by the patient to temporarily place the receptacle 22 on a fixture, such as the back of a chair (not shown), before or after voiding, or both. Alternatively, as shown in FIG. 7, the back wall 32 may have an opening 64 for temporary placement of the receptacle 22 on a fixture such as a nail (not shown).

The foregoing detailed description is given for clearness of understandinng only, and no unnecessary limitations should be understood therefrom, as modifications will be obvious to those skilled in the art.

I claim:

1. A self-administratable device to measure a discharge of urine, comprising:
    a movable receptacle having a chamber, port means adjacent an upper end of the receptacle and being positionable adjacent the point of discharge to receive the discharge for passage of the discharge into the chamber, and means associated with said chamber for measuring a dynamic characteristic of the urine discharge; and
    porous means intermediate the port means and chamber said porous means being sufficiently porous to permit an even flow of the discharge through the porous means without impairment of the measuring capabilities of the measuring means, and said porous means being sufficiently thick and closed to break up the discharge and prevent splashing of the discharge against the user.

2. The device of claim 1 wherein the measuring means comprises, means for separating the chamber into a passageway for receiving the discharge from said porous means, a compartment to receive the discharge from the passageway adjacent a lower end of the receptacle, a channel means communicating with the compartment through vertically disposed opening means in the receptacle, and means for indicating the approximate maximum height of urine reached in said compartment.

3. The device of claim 1 wherein the porous means comprises a strip of porous material.

4. The device of claim 3 wherein the porous material comprises open cell polyurethane.

5. The device of claim 3 wherein said strip is removably positioned in the receptacle.

6. The device of claim 3 wherein said material is treated with a foam preventing material.

7. The device of claim 6 wherein the porous material is treated with a silicone containing solution.

8. The device of claim 3 wherein said receptacle includes a discharge receiving portion adjacent an upper end of the receptacle, said discharge receiving portion defining said port means and a cavity, said receptacle having opening means communicating between said cavity and chamber, and said strip being positioned in the cavity with at least a part of the strip covering the opening means, said discharge passing through the port means into the cavity and through said strip and opening means into said chamber.

9. The device of claim 8 wherein said opening means is located adjacent a lower end of the cavity.

10. The device of claim 8 wherein the port means has a generally triangular shape.

11. The device of claim 8 wherein said discharge receiving portion includes a back wall and a lower wall, and said strip includes a first section located adjacent the back wall and a second section located adjacent the lower wall.

12. The device of claim 11 wherein said opening means is located adjacent the juncture of the back wall and lower wall.

13. The device of claim 8 wherein the discharge receiving portion includes a pair of side walls connecting the back wall and lower wall.

14. The device of claim 13 wherein said sidewalls define a tapered configuration from the back wall to a front of the discharge receiving portion.

* * * * *